United States Patent

Maier

[15] 3,692,945

[45] Sept. 19, 1972

[54] CIRCUIT ARRANGEMENT FOR TELECOMMUNICATION SWITCHING SYSTEMS EMPLOYING TIME-DIVISION MULTIPLEX OPERATION

[72] Inventor: Karl Maier, Stuttgart, Germany

[73] Assignee: International Standard Electric Corporation, New York, N.Y.

[22] Filed: Nov. 27, 1970

[21] Appl. No.: 93,230

[30] Foreign Application Priority Data

Dec. 2, 1969 Germany..........P 19 60 486.5

[52] U.S. Cl...............................................179/18 GF

[51] Int. Cl................................................H04q 3/50

[58] Field of Search..................................179/18 GF

[56] References Cited

UNITED STATES PATENTS

| | | | |
|---|---|---|---|
| 3,573,388 | 4/1971 | Dagnall | 179/18 GF |
| 3,525,815 | 8/1970 | de Buck | 179/18 GF |
| 3,319,009 | 5/1967 | Regnier | 179/18 GF |

*Primary Examiner*—Kathleen H. Claffy
*Assistant Examiner*—William A. Helvestine
*Attorney*—C. Cornell Remsen, Jr., Walter J. Baum, Paul W. Hemminger, Charles L. Johnson, Jr., James B. Raden, Delbert P. Warner and Marvin M. Chaban

[57] ABSTRACT

Each inlet of a TDM switching matrix and a plurality of associated control lines are connected to equivalent inputs of first NAND-circuits whose outputs are combined into the outlets of the switching matrix via second NAND-circuits. Decoders and matching circuits are not needed. If the control inlets are not wired, a simulation of a selection by special block circuits is prevented.

9 Claims, 10 Drawing Figures

INVENTOR
K. MAIER
BY D. D. Warner
ATTORNEY

CIRCUIT ARRANGEMENT FOR TELECOMMUNICATION SWITCHING SYSTEMS EMPLOYING TIME-DIVISION MULTIPLEX OPERATION

The present invention relates to a circuit arrangement for telecommunication and particularly telephone switching systems with time-division multiplex through-switching of coded signals in four-wire operation via coordinate switching matrices made up of electronic switching elements.

The circuit arrangement according to the invention has for its object to establish alternative connections between the inlets and outlets of the switching matrices, each inlet normally being allowed to be connected to only one outlet, and vice versa. For time-division multiplex switching, the object is extended to the effect that an input may be connected to different outputs in different time channels, and vice versa.

As a rule, known circuit arrangements of that kind receive the information as to which switching elements must be operated as coded control instructions from a central control unit. In order to be able to operate individual switching elements, the coded control instructions must be decoded and applied to the individual switching elements via matching circuits because the known electronic switching elements are not capable of processing any coded control instructions.

The circuit arrangement according to the invention is characterized in that each inlet of a switching matrix and the control lines for the coded control signals of the cross points of a column are, in said matrix, connected to inputs of first NAND-circuits, which inputs are equivalent with respect to each other, that the outputs of said NAND-circuits of a row are respectively connected to the inputs of a further NAND-circuit whose output corresponds to a matrix outlet, and that in said control lines there are arranged blocking devices which, if the control inlets are not wired, connect biasing potential to the respective inputs of said first NAND-circuits.

An electronic switching element which is capable of carrying out both the task of signal through-switching and that of performing logical operations is described e.g., in the patent application P 19 48 097.8 (case K.Maier -2) corresponding to U.S. Pat. application No. 65,913 filed Aug. 21, 1970 and now abandoned, and to a patent application in Great Britain, No. 44418/70 filed Sept. 17, 1970. The switching element described there is suitable for both analog and digital through-switching. In digital through-switching (e.g., for PCM), however, it is also possible to use known digital logic circuits for simultaneously carrying out logical operations and through-switching.

In the circuit arrangement according to the invention, if positive logic (e.g.: 5V = L, OV = O) is used, the first NAND-circuits and the further NAND-circuits may be replaced by a combination of AND-circuits with subsequent OR-circuits or, if negative logic (e.g., 5V = O, OV = L) is used, by a combination of OR-circuits with subsequent AND-circuits or a combination of NOR-circuits with subsequent NOR-circuits.

The invention will now be explained with reference to an embodiment thereof using NAND-circuits. This combination and the other ones may all be substituted by each other, and therefore, need not be explained separately.

The advantages of the circuit arrangement according to the invention over the prior art lie in the fact that the decoders and matching circuits are rendered unnecessary because such switching elements enable the addresses to be decoded in the switching element itself.

Since the control instructions are applied in coded form, the groups of control lines become smaller and the number of required plug and socket connections at the transfer points between separate subassemblies decreases. Since the switching times of the saved decoding and matching circuits are eliminated and the groups of control lines are shortened, the switching speed is considerably increased, so that in time-division multiplex operation more time channels can be switched through via a switching matrix, or that smaller switching matrices with a smaller number of inlets and outlets are sufficient. Since the blocking devices are incorporated into the control lines before the first NAND-circuits, there is no need for special switching measures for the protection against malfunctions, e.g., during the withdrawal of control plates, i.e., for example, of address storage plates.

The circuit arrangement according to the invention may also be used in electronic space-division multiplex switching networks, in which, however, the increase in switching speed during the control process required only once for each connection is of no weight.

A special feature of the circuit arrangement according to the invention is characterized in that said blocking devices in said control lines for preventing the unintentional through-switching when the control inlets are not wired are designed as resistors which connect biasing potential to each control inlet, thus keeping it blocked when it is not wired. This solution is distinguished by the small investment required. To avoid reflexion interferences, the input impedance of the blocking device may be so dimensioned as to be equal to the characteristic impedance of the control lines.

According to a further feature, in order to protect the circuit arrangement according to the invention against interference, said blocking devices in said control lines for preventing the unintentional through-switching when the control inlets are not wired are designed as differential amplifiers which unblock one of the two inverse output control lines connected to said first NAND-circuits only if a potential difference between inverse control inlets appears while blocking both output control lines when the control inlets are not wired and, consequently, there is no potential difference at the inlet. In this feature, induced longitudinal voltages on the control lines, for example, have no influence on the control of the switching elements.

An alternative to the above feature is characterized in that said blocking devices for preventing the unintentional through-switching in single-conductor control lines are designed as differential amplifiers grounded at one terminal which, when a blocking signal is applied, block only the respective output control line while blocking both output control lines when the inlet is not wired.

In this case, the protection against influences by noise voltages is achieved by running along a common ground wire or separate ground wires for all control lines.

Another feature of the circuit arrangement according to the invention is characterized in that said control lines are grounded via diodes in order to keep any negative voltage peaks away from said switching elements.

The invention will now be explained in conjunction with the embodiments illustrated in the accompany-ing drawings in which.

Figure 1:
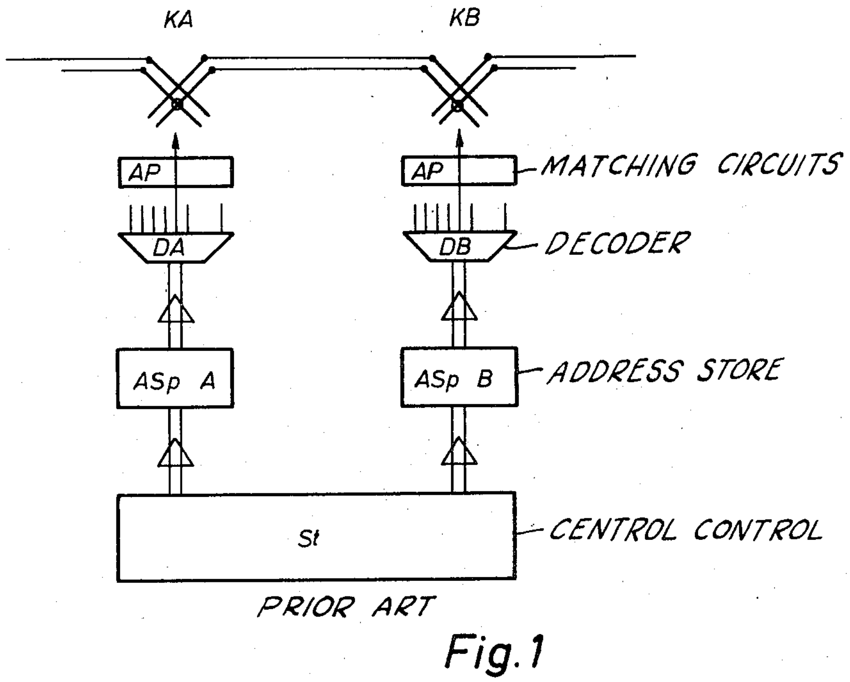
FIG. 1 shows a block diagram of a known circuit arrangement.

FIG. 1, in a block diagram, shows a known circuit arrangement for controlling a time-division multiplex switching network having two stages in the particular example being described. A central control unit St accepts in any form the orders for connections to be established in the switching network. Each connecting stage KA, KB has its own address store ASpA, ASpB into which the central control unit St writes, in coded form, e.g., in the binary code, the addresses of the switching elements to be operated cyclically in the case of time-division multiplex switching. The double lines provided with an arrow-head are to illustrate the multiplexed form of the coded control information. Since in known switching systems the switching elements cannot process any coded control instructions themselves, decoders DA and DB are inserted between the address stores and the matrix rows for each connecting stage. The decoder converts the coded control instructions applied to it cyclically into control signals on the control lines individually associated with each cross point. Control signalling is thus effected in a 1-out-of-$n$ code where $n$ is the number of switching elements per matrix row. In most cases, matching circuits AP are required before the electronic switching elements. As a rule, it is necessary to design the extensive decoders DA, DB as separate subassemblies. This results in very expensive cable connections and plug and socket connections being required at the transfer points, which are the cause of interference due to line delays, reflexions, bad contacting and disconnections. In addition, the possibly necessary matching circuits may cause time delays.

Figure 2:
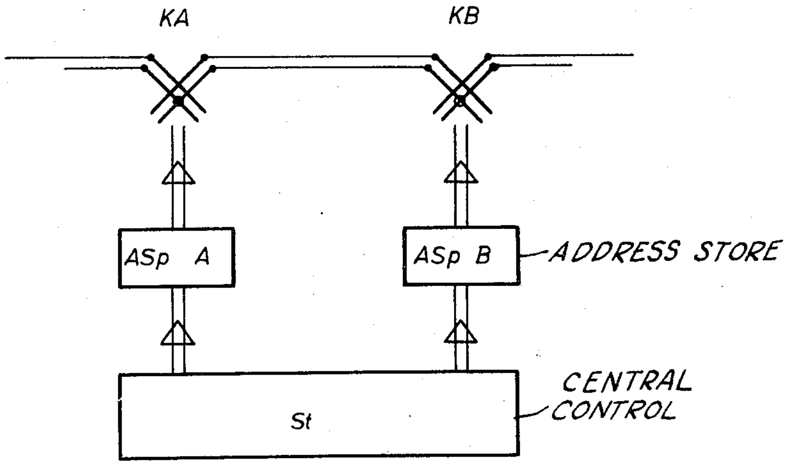
FIG. 2 shows a block diagram of the circuit arrangement according to the invention and serves to explain the fundamental advantages over the circuit arrangement of FIG. 1.

In the structure shown in FIG. 2 with circuit arrangements according to the invention, the decoders DA, DB and the otherwise possibly necessary matching circuits AP of FIG. 1 between the address stores ASpA, ASpB and the connecting stages KA, KB are omitted. The switching elements are controlled directly with the coded control instructions sent out by the address stores ASpA, ASpB. Because of the reduction in size of the switching elements, as already indicated above, it is even possible to combine the address stores ASpA, ASpB with the respectively associated switching matrix into one subassembly, so that a transfer point with plugs between the address stores and the switching matrices is saved. Otherwise, if coded control instructions are used, such a transfer point has at least a considerably smaller number of lines and contacts.

Figure 3:
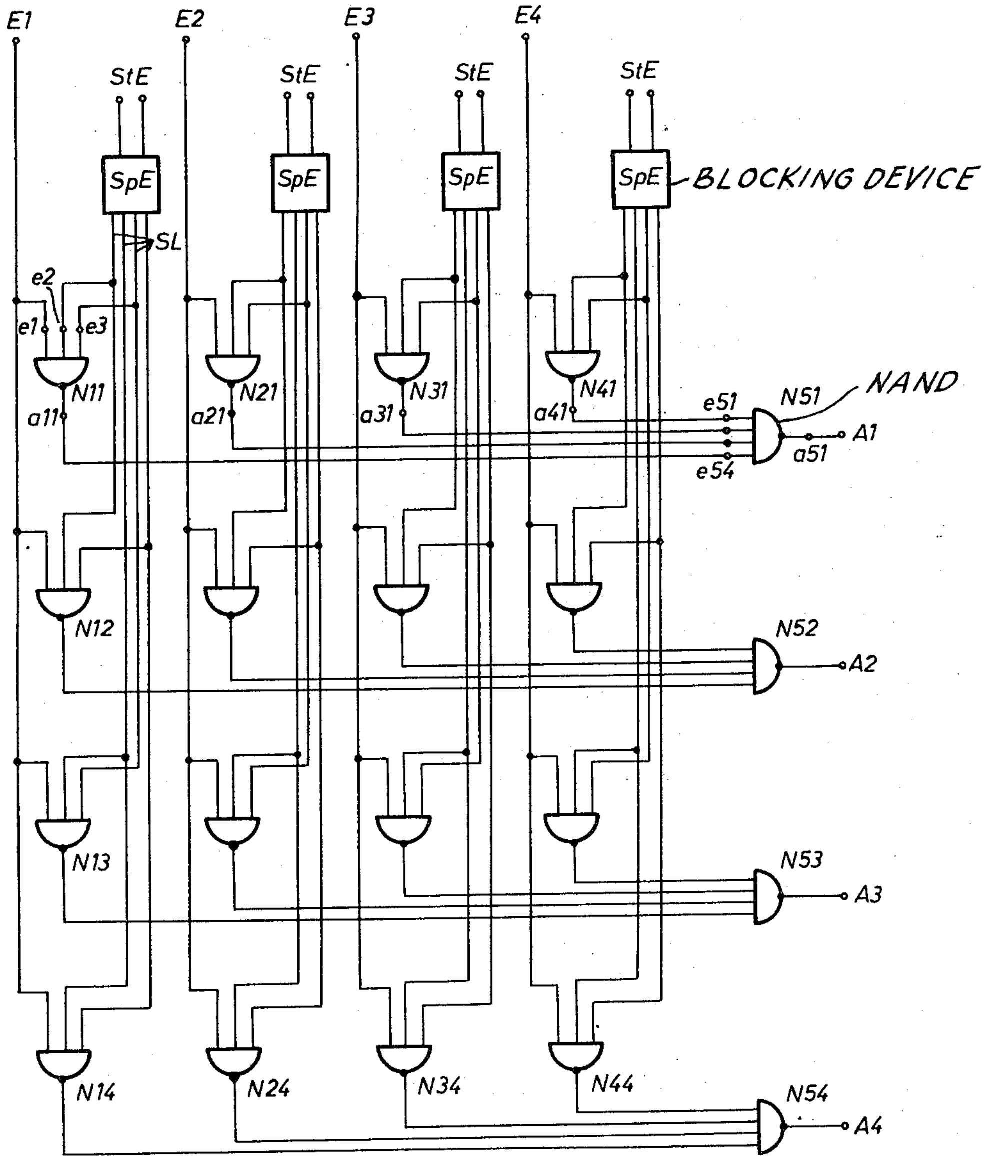
FIG. 3 shows a block diagram of a switching matrix according to the invention.

The circuit arrangement according to the invention shown in FIG. 3 serves to establish connections between the inlets E1 to E4 and the outlets A1 to A4. In the example being described, there are four inlets and four outlets. The number of inlets and outlets may be different and need not be identical. The inlet E1 for the connection to be alternatively established to one of the outlets A1 to A4 is connected in the matrix to an input $e1$ if there are four different first NAND-circuits N11 to N14. The other two inputs $e2$, $e3$ of the NAND-circuits are connected to different combinations of control lines SL which in turn are connected to a control inlet StE via a blocking device SpE. In the particular example being described, it was assumed that two-digit binary code words are applied as control instructions to the control inlets StE, i.e., one code digit corresponds to each line of the control inlet StE, and the binary code values O and L correspond e.g., to the potentials OV and +5V of a line. In the control lines SL, each line corresponds to a code value, so that with each code word one of the NAND-circuits N11 to N14 can be selected by means of a combination of positive control signals. In this example, the blocking device thus provides at the same time the inverted input signals.

This applies analogously to the other inlets E2 to E4 of the switching matrix with respect to the NAND-circuits N21 to N24, N31 to N34 and N41 to N44. The outputs a11 to $a41$ of the first four NAND-circuits N11 to N41 are connected to four inputs $e51$ to $e54$ of a further NAND-circuit N51 whose output $a51$ is at the same time the matrix outlet A1. Analogously, the outlets of the remaining first NAND-circuits N12 to N44 are connected in rows to the matrix outlets A2, A3 and A4 via further NAND-circuits N52 to N54. The significance and function of the blocking devices SpE will be explained later in conjunction with FIGS. 6 to 8.

Figure 4:
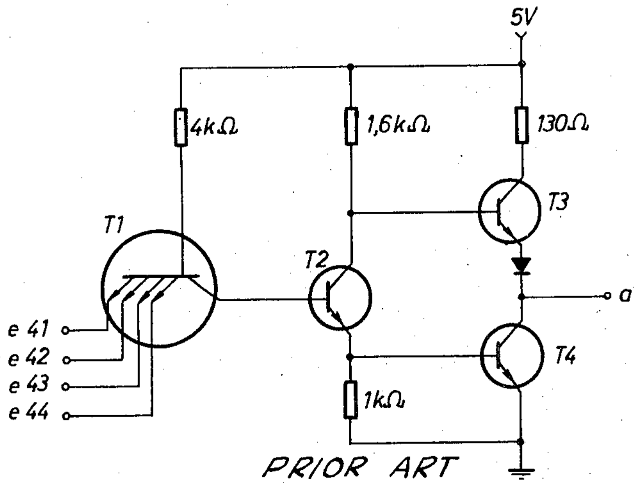
FIG. 4 shows a known embodiment of a NAND-circuit.

FIG. 4 shows an embodiment of a commercially available NAND-circuit of the TTL-type. The inputs $e41$ to $e44$ are connected to four separate emitters of an electronic switching element T1 whose collector controls the base of a NPN transistor T2. The collector and the emitter of the transistor T2 are connected to the bases of two further NPN transistors T3 and T4, respectively, between whose coupled emitter and collector, respectively, there is connected the output $a$. The circuit and its mode of operation is generally known; externally, it performs the following functions: If a potential of +5V is connected to all inputs $e41$ to $e44$, the switching element T1 blocks and the transistor T2 conducts. As a result of the voltage drop across the emitter resistor, the transistor T4 becomes conducting, so that a potential of about 0 volts appears at the output *a*. If a potential of 0 volts is connected to one of the inputs *e*41 to *e*44, the switching element T1 remains conducting, and as a result, a potential of about +5V appears at the output *a*.

If the higher potential of +5V is designated by the logical symbol L and the lower potential of OV by the symbol O (so-called positive logic), the circuit performs the NAND-function *a* = *e*41 & *e*42 & *e*43 & *e*44. If the two potentials +5V and OV are designated by the exchanged symbols O and L, respectively (so-called negative logic), the circuit performs the NOR-function *a* = *e*41 v *e*42 v *e*43 v *e*44.

Since the NAND-circuit shown in FIG. 4 has four inputs *e*41 to *e*44, it is suitable for a switching matrix with an edge length of 8 inlets, with one inlet being arranged in the path to be completed while the other inlets are connected to three lines out of a group of six control lines, over which group the control instructions are applied as three-digit binary code words, with one out of two lines being marked in each code digit.

Such NAND-circuits are offered singly or as subassembly containing several pieces as integrated circuit.

Figure 5:
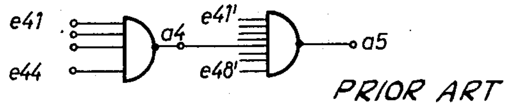
FIG. 5 shows a block diagram of two series-connected NAND-circuits and serves to explain how such a circuit is used to perform an AND-function with following OR-operation.

If two such NAND-circuits are connected in series in the manner shown in FIG. 5, with the free inputs *e*41' to *e*48' being connected to further first NAND-circuits (not shown), this circuit will perform the following functions in positive logic:

$$a4 = \overline{e41 \,\&\, e42 \,\&\, e43 \,\&\, e44}, \quad (1)$$

$$a5 = \overline{e41' \,\&\, e42' \,\&\, \ldots \,\&\, e48'}, \quad (2)$$

$$a5 = \overline{\overline{e41 \,\&\, \ldots \,\&\, e44} \,\&\, \overline{e61 \,\&\, \ldots \,\&\, e64} \,\&\, \ldots}, \quad (3)$$

where *e*61 to *e*64, ... are the inputs of the further first NAND-circuits (not shown). The Equation (3) may be transformed into $$a5 = (e41 \,\&\, \ldots \,\&\, e44) \vee (e61 \,\&\, \ldots \,\&\, e64) \vee \ldots \quad (4).$$

Accordingly, a signal L appears at the output *a*5 of the second NAND-circuit whenever a signal L is applied to the signal input (e.g., input e41) of a just selected first NAND-circuit. This is exactly in accordance with the above-mentioned object. It is left to the control to prevent or allow a double connection between two inputs and an output (conference, cutting-in etc.).

When the inputs *e*41 to *e*44 are not wired, a potential OV appears at the output a of the NAND-circuit of FIG. 4, i.e., a selection of the NAND-circuit is simulated if e.g., the preceding address storage plate is drawn out of the rack for checking or repairing purposes or a lead is interrupted.

Figure 6:
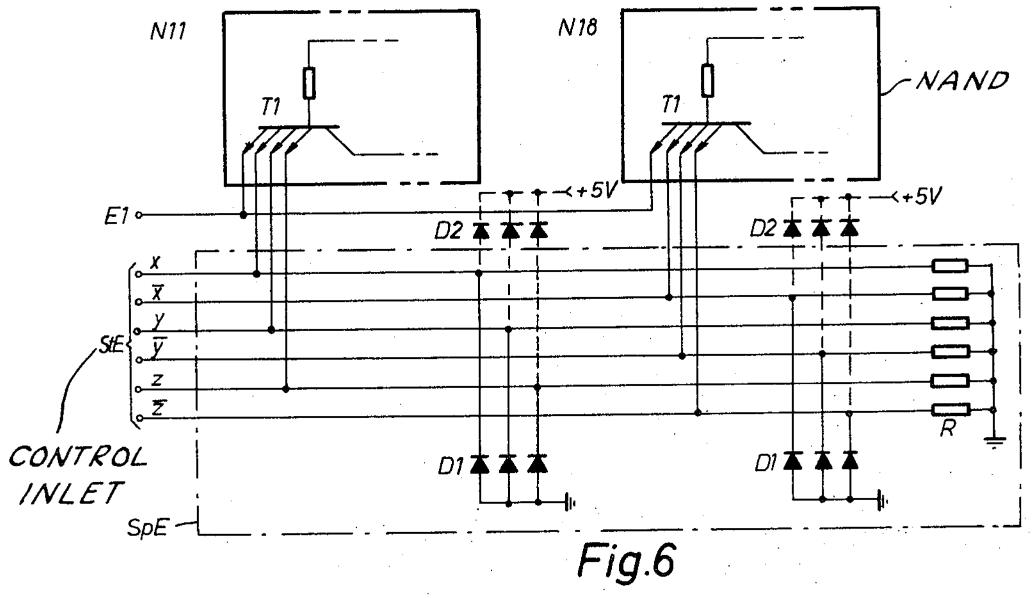
FIG. 6 shows an embodiment of a blocking device.

FIG. 6 shows a possibility of how the blocking devices SpE for preventing this undesired effect can be designed. The control lines *x* and $\bar{z}$ coming from the control inlet StE are connected to ground potential via resistors R. If the control inlet StE is not wired, a current flows to ground via the base-emitter diodes of the switching elements T1 in the outlined NAND-circuits N11 and N18 and via the resistors R, and the simulation of the selection does not take place. If, however, the control inlet StE is wired and a path is to be completed e.g., from the inlet E1 via the NAND-circuit N11, a voltage of +5V is connected to the control lines *x*, *y* and *z*. In this case, the resistors R represent only a load connected in parallel but do not prevent the signal applied to the inlet E1 from being switched through. Because, if a signal of +5V is applied to the inlet E1, all base-emitter diodes of the switching element T1 in the NAND-circuit N11 are cut off. In addition, the resistors R may be dimensioned so as to be equal to the characteristic impedance Z of the control lines. Thus, any interference due to reflexion is prevented at the same time.

The diodes D1 shown in FIG. 6 represent a protection for the base-emitter diodes of the switching elements T1 against negative voltage peaks. Such voltage peaks may be caused by noise voltages or reflexions. The diodes may be used for the interception of interference due to reflexion. For the protection against positive excess voltages, this circuit may be extended by diodes D2 represented by broken lines.

Figure 7:
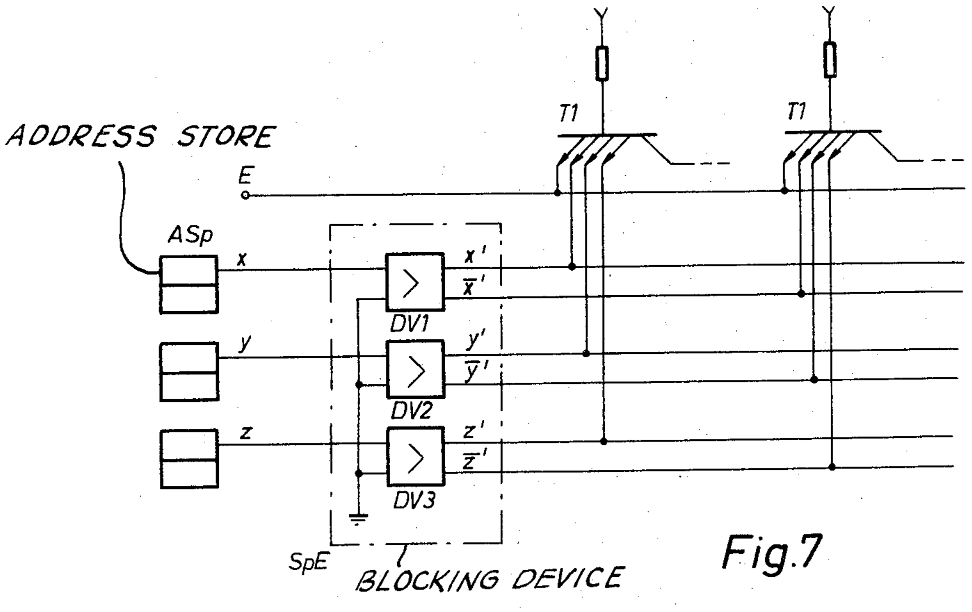
FIG. 7 shows another embodiment of a blocking device.

FIG. 7 shows another embodiment of the blocking device SpE. In this case, it is assumed that the control instructions are transmitted by the address store ASp over the control lines *x*, *y* and *z* as O or +5V signals, respectively. It is possible that, as a protection against interference, a common ground wire or a ground wire for each conductor are required for shielding. Arranged in the blocking device SpE are three differential amplifiers DV1, DV2 and DV3 whose one input is connected to one of the control lines *x*, *y* and *z* and whose other input is commonly grounded. The output control lines $x'$, $\bar{x}'$ to $z'$, $\bar{z}'$ correspond to the six control lines in FIG. 6, and connected thereto in coded distribution are the emitters of the switching elements T1. The differential amplifier DV1 transmits a signal +5V onto the output control line $x'$ and a signal OV onto the output control line $\bar{x}'$ if a higher potential than that at the grounded input, e.g., +5V, is applied to the input connected to the control line *x*. In contrast, the output control lines $x'$ and $\bar{x}'$ receive exchanged signals OV and +5V, respectively, if a potential OV is applied over the control line *x*. If the control line *x* is not wired at the input end, at least one of the two output control lines $x'$ and $\bar{x}'$ receives a potential OV. The same applies analogously to the other differential amplifiers DV2 and DV3 with respect to the control line *y* and *z*, respectively. Thus it is achieved that, if the control inlet is not wired, all switching elements T1 conduct and the inlet E is not switched through to the outlet via any of the switching elements.

Differential amplifiers are generally known basic circuits and commercially available. Therefore, they need not be described here.

Figure 8:
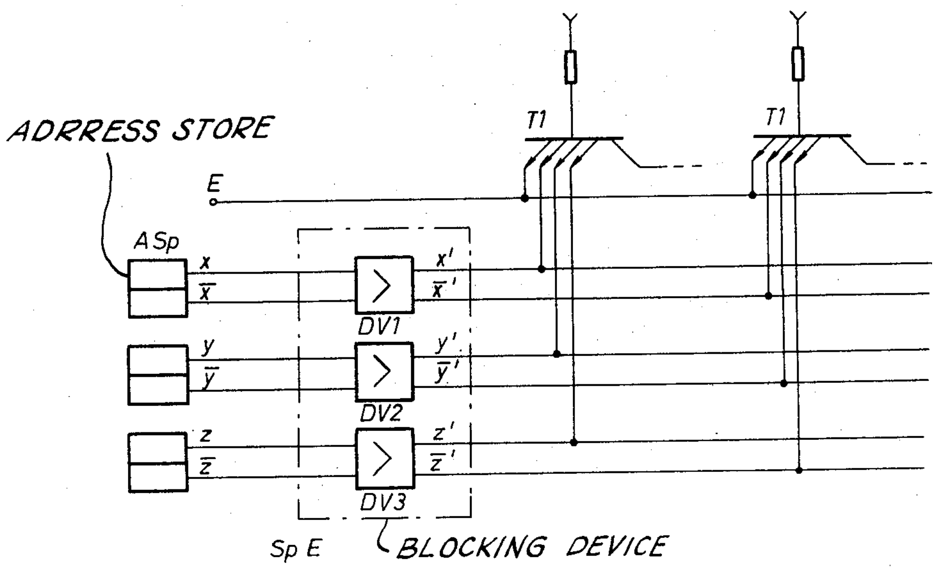
FIG. 8 shows a modification of the circuit arrangement illustrated in FIG. 7.

FIG. 8 shows a modification of the circuit arrangement of FIG. 7, in which the control instructions are transmitted in binary-digit fashion already from the address store ASp to the differential amplifiers DV1 to DV3 of the blocking device SpE over two oppositely marked control lines *x*, $\bar{x}$ and *y*, $\bar{y}$ and *z*, $\bar{z}$, respectively. In this case, any ground wires for shielding purposes may be omitted. Here, each potential difference at the input of a differential amplifier is passed on as corresponding different marking to the output control lines $x'$ and $\bar{x}'$, and $y'$ and $\bar{y}'$ and $z'$ and $\bar{z}'$, respectively. When the input is not wired, each differential amplifier marks both connected output control lines with 0 volts. The structure of the differential amplifiers, which are represented as blocks here, is generally known. However, instead of commercially available differential amplifiers, commercially available ECL(emitter-coupled-logic)circuits may be used whose structure and mode of operation are also generally known. The circuit arrangement of FIG. 8 has the particular advantage that any longitudinal voltages occurring on the control lines *x* to *z* have no influence whatsoever on the control of the switching elements T1. Since differential amplifiers are operated not in the saturation region but in the active region, they also have the advantage of a very short switching time. To avoid any interference due to reflexion, the input impedance of the differential amplifier may also be dimensioned so as to be equal to the characteristic impedance of the control line, or an intercepting circuit with diodes, e.g., as shown in FIG. 6, may be connected before.

Figure 9:
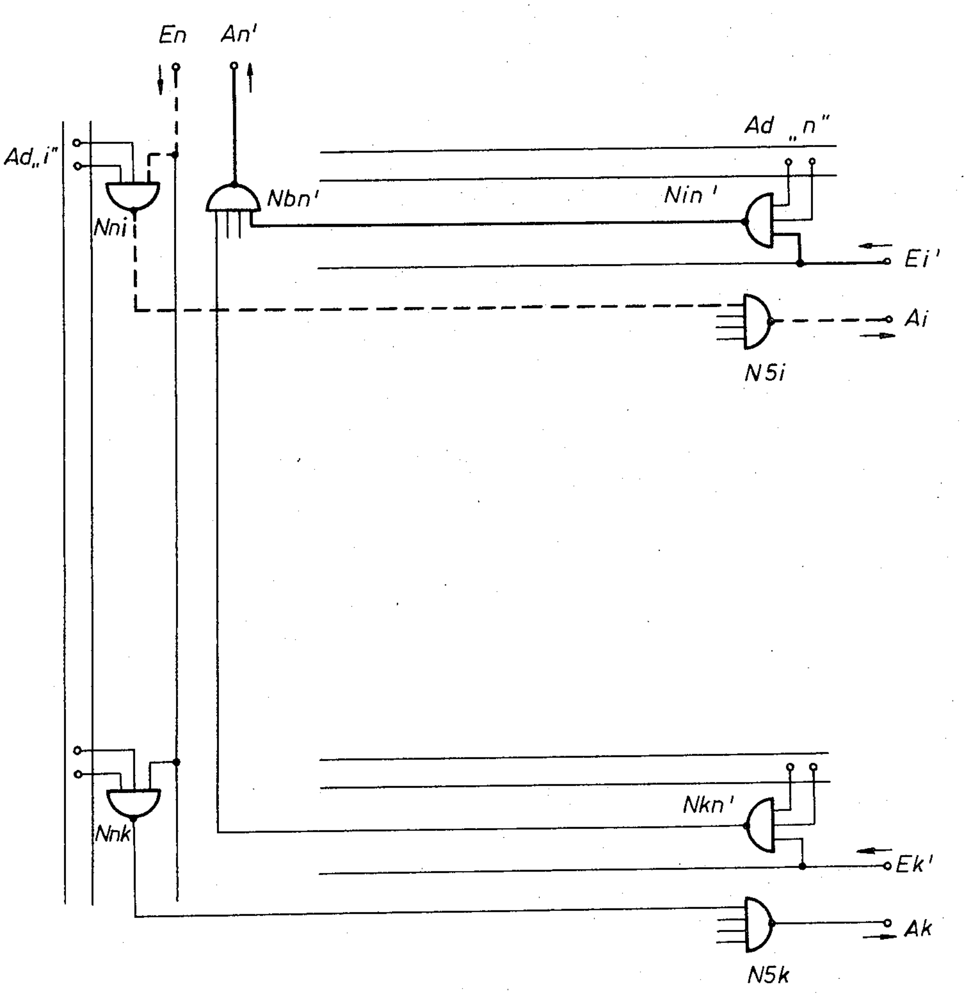
FIG. 9 shows part of the circuit and serves to explain four-wire operation.

FIG. 9 illustrates the course of a connection in four-wire operation via two separate groups of NAND-circuits. A first group of NAND-circuits with the structure illustrated in more detail in FIG. 3 comprises the NAND-circuits Nni, Nnk, N5i and N5k. A second group of NAND-circuits with the NAND-circuits Nin', Nkn' and N6n' has the same structure as of the first group but the rows and columns have been exchanged with respect to their functions. To establish a four-wire connection between an inlet En, An' and an outlet Ai, Ei', the address Ad *i* must be transmitted onto the group of control lines of the column inlet En and the address Ad *n* must be transmitted onto the group of control lines of the row inlet Ei'. The connection of the outward direction then extends from the inlet En to the outlet Ai via the NAND-circuits Nni and N5i (broken line) while the connection of the backward direction then extends from the inlet Ei' to the outlet An' via the NAND-circuits Nin' and N6n' (heavy line).

Figure 10:
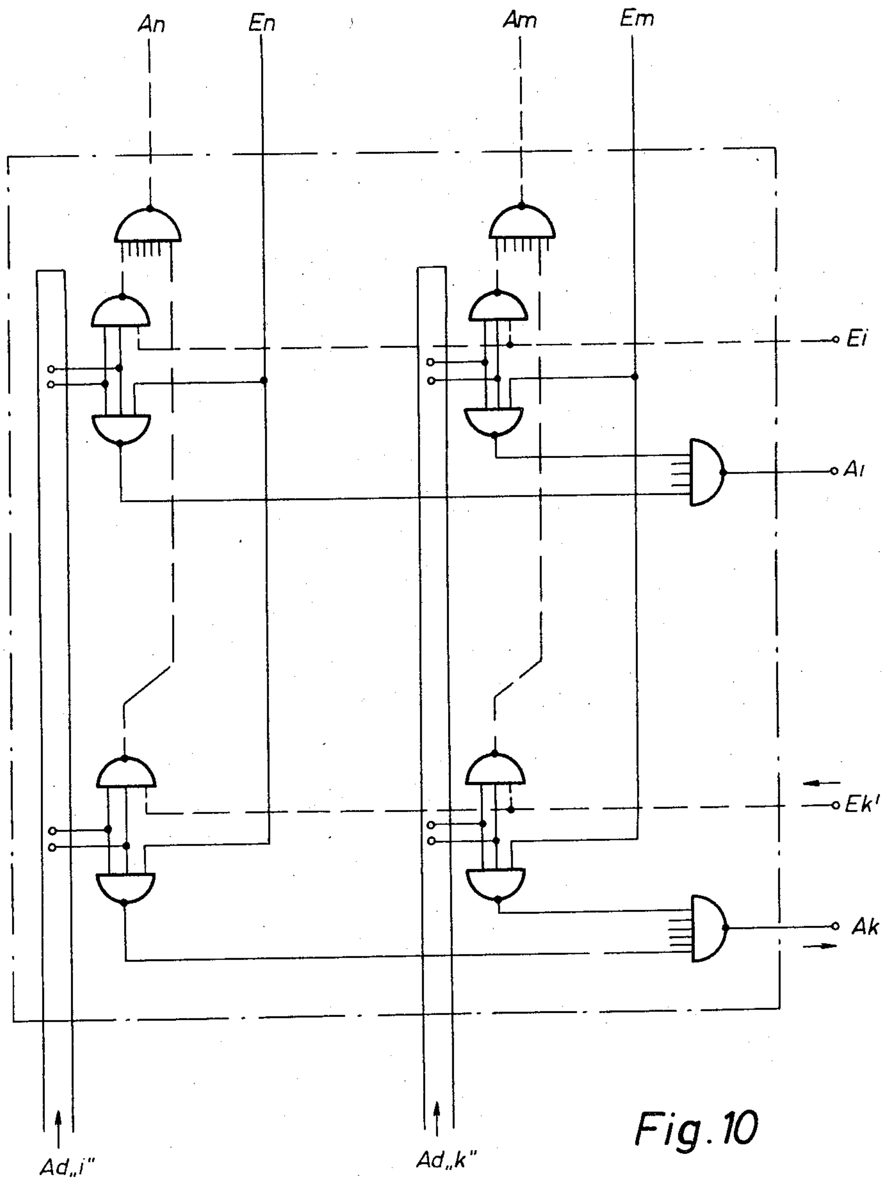
FIG. 10 shows part of another circuit for four-wire operation.

If a connection were to be established from the same column inlet to the row outlet Ak, another address Ad *k* would have to be transmitted onto the same group of control lines of the column inlet, and the same address Ad *n* as above would have to be transmitted onto another group of control lines of the row inlet Ek'. This relatively complicated control may be avoided by forming switching matrices with different wiring as shown in FIG. 10, in which the same matrix row is selected with the same address for both speech directions.

What is claimed is:

1. A circuit arrangement for telecommunication switching systems for time-division multiplex switching of coded signals in four-wire operation via coordinate switching matrices made up of electronic switching elements, comprising a switching matrix, a plurality of inlets to the matrix, a plurality of control lines for reception of coded control signals for cross points in a column in said matrix, a first plurality of NAND-circuits responsive to signals from the inlets and the control lines, outputs of a row of said NAND-circuits respectively connected to the inputs of a further NAND-circuit whose output corresponds to a matrix outlet, and blocking devices arranged in said control lines which, if the control inlets are not wired, connect biasing potential to the respective inputs of said NAND-circuits.

2. A circuit arrangement according to claim 1, in which said blocking devices in said control lines for preventing the unintentional through-switching when the control inlets are not wired are resistors connecting biasing potential to each control inlet, thus keeping it blocked when it is not wired.

3. A circuit arrangement according to claim 1, in which the input impedance of said blocking device is equal to the characteristic impedance of said control line.

4. A circuit arrangement according to claim 1, in which said blocking devices in said control lines for preventing the unintentional through-switching when the control inlets are not wired are differential amplifiers which unblock one of the two inverse output control lines connected to said first NANd-circuits only if a potential difference between inverse control inlets appears while blocking both output control lines when the control inlets are not wired and, consequently, there is no potential difference at the inlet.

5. A circuit arrangement according to claim 1, in which said blocking devices for preventing the unintentional through-switching in single-conductor control lines are designed as differential amplifiers grounded at one terminal which, when a blocking signal is applied, block only the respective output control line while blocking both output control lines when the inlet is not wired.

6. A circuit arrangement according to claim 1, in which said control lines are grounded via diodes in order to keep any negative voltage peaks away from said switching elements.

7. A circuit arrangement according to claim 6, in which interference due to positive excess voltages is prevented by means of diodes.

8. A circuit arrangement according to claim 4, in which ECL gates are used as blocking devices.

9. A circuit arrangement for telecommunication switching systems for time-division multiplex switching of coded signals in four-wire operation via coordinate switching matrices made up of electronic switching elements, comprising a switching matrix, a plurality of inlets to the matrix, a plurality of control lines for reception of coded control signals for cross points in a column in said matrix, a first plurality of GATE-circuits responsive to signals from the inlets and the control lines, outputs of a row of said GATE-circuits respectively connected to the inputs of a further GATE-circuit whose output corresponds to a matrix outlet, and blocking devices arranged in said control lines which, if the control inlets are not wired, connect biasing potential to the respective inputs of said GATE-circuits.

* * * * *